United States Patent
Bohne et al.

(10) Patent No.: US 6,761,499 B2
(45) Date of Patent: Jul. 13, 2004

(54) BEARING SHELL FOR BALL-AND-SOCKET JOINTS

(75) Inventors: Manfred Bohne, Quernheim (DE); Stefan Klumpe, Ostercappeln (DE); Dirk Stuntebeck, Steinfeld (DE)

(73) Assignee: ZF Lemförder Metallwaren AG, Dielingen (DE)

(*) Notice: Subject to any disclaimer, the term of this patent is extended or adjusted under 35 U.S.C. 154(b) by 93 days.

(21) Appl. No.: 10/019,630

(22) PCT Filed: Jun. 13, 2001

(86) PCT No.: PCT/DE01/02244

§ 371 (c)(1),
(2), (4) Date: Dec. 27, 2001

(87) PCT Pub. No.: WO01/96754

PCT Pub. Date: Dec. 20, 2001

(65) Prior Publication Data

US 2003/0072609 A1 Apr. 17, 2003

(30) Foreign Application Priority Data

Jun. 16, 2000 (DE) .......................................... 100 28 984

(51) Int. Cl.$^7$ ................................................ F16C 11/00
(52) U.S. Cl. ........................ 403/14; 403/141; 403/142
(58) Field of Search ................................ 403/141, 142, 403/143, 135, 13, 14, 122

(56) References Cited

U.S. PATENT DOCUMENTS

| 2,527,787 A | | 10/1950 | Berger |
| 3,744,859 A | | 7/1973 | Ringel |
| 4,435,101 A | | 3/1984 | Sugiyama et al. |
| 4,619,658 A | | 10/1986 | Pappas et al. |
| 6,019,541 A | * | 2/2000 | Maughan ................. 403/141 X |
| 6,206,785 B1 | * | 3/2001 | Thomas .................. 403/141 X |

FOREIGN PATENT DOCUMENTS

| DE | OS 22 34 338 | 7/1972 |
| GB | 2 052 620 A | 6/1980 |
| GB | 2 181 496 A | 9/1986 |
| WO | WO 99/32796 | 12/1998 |

* cited by examiner

Primary Examiner—John R. Cottingham
(74) Attorney, Agent, or Firm—McGlew and Tuttle, P.C.

(57) ABSTRACT

A bearing shell for ball-and-socket joints or ball sleeve joints is provided with an inner hollow spherically designed bearing surface (3). The bearing shell has an outer cylindrically designed support surface with which the bearing shell can be inserted into a joint housing. The bearing shell has a multipart design with at least two shell parts (1, 2), which can be detachably coupled with one another by a clamping device (6, 8). The parting plane between the half shells extends in the direction of the central longitudinal axis (10) of the bearing shell.

18 Claims, 3 Drawing Sheets

BEARING SHELL FOR BALL-AND-SOCKET JOINTS

FIELD OF THE INVENTION

The present invention pertains to a bearing shell for ball-and-socket joints or ball sleeve joints with an inner hollow spherically designed bearing surface and an outer, cylindrically designed support surface, with which the bearing shell can be inserted into a joint housing.

BACKGROUND OF THE INVENTION

Bearing shells of this type are used in a very great number of variants in ball-and-socket joints and ball sleeve joints. Such joints usually have a ball shaft, which has a ball section at the end in the case of ball-and-socket joints and in the middle in the case of ball sleeve joints, and this ball section is accommodated in the hollow spherical bearing surface of the bearing shell, so that the ball shaft can perform pivoting and rotating movements in relation to the central longitudinal axis of the joint. The bearing shells are in turn usually accommodated in cylindrical holes of a joint housing. The manufacture of the bearing shells of this class, which are usually manufactured from plastic, especially POM, is carried out according to the injection molding technology, and the injection mold is designed as a two-part mold with an inner spherical core and an outer hollow mold adapted to the outer shape of the bearing shell. The inner spherical mold part is separated from the finished bearing shell by forced mold release after the injection molding operation, while the prior-art bearing shells are subject to relatively great deformations. To make these deformations possible, the bearing shells therefore have a plurality of slots which extend axially in the direction of the central longitudinal axis and reach approximately the equatorial plane of the hollow spherically designed bearing inner surface. These slots facilitate the forced release of the bearing shell from the mold, but the selection of the material of a bearing shell that can be removed from the mold by forced mold release is limited as a consequence of the necessary great expansion and the low modulus of elasticity. The limitation of the material selection has in turn adverse effects on the loadability of the bearing shell and consequently of the entire ball-and-socket joint or ball sleeve joint at high temperatures and high loads, because the material of the bearing shell tends to flow in extreme situations, and there is a possibility of migration of the shell material, especially in the area of the slots. This may possibly result in a change in the geometry of the hollow spherical bearing surface with a resulting increase in wear and even complete failure of the ball-and-socket joint or ball sleeve joint affected.

SUMMARY OF THE INVENTION

The object of the present invention is therefore to provide a bearing shell of this type which has increased loadability and service life based on an expanded selection of available materials, while the conventional manufacture shall continue to be able to be carried out according to the injection molding technology.

According to the present invention, the bearing shell is designed as a multipart shell comprising at least two shell parts, which can be detachably coupled with one another by a clamping device, wherein the parting plane between the shell parts extends in the direction of the central longitudinal axis of the bearing shell.

Due to the measure according to the present invention, the previously one-part bearing shell of this type can be composed of a plurality, preferably two half shells during the assembly of the ball-and-socket joint or ball sleeve joint. The half shells are manufactured in the conventional manner according to the injection molding technology, but the shell material does not need to have special elastic properties during the removal of the half shells from the mold. It is therefore also possible to use harder and consequently more wear-resistant plastics for the bearing shells compared with the state of the art. In addition, the load limit of the bearing shells according to the present invention is correspondingly increased due to the fact that the slots are not present because forced mold release is no longer necessary.

It proved to be particularly advantageous to design the clamping device such that it comprises at least one pin projecting beyond the particular parting surface of the shell parts and at least one corresponding recess arranged in the respective adjoining shell part. The dimensions of the pin and the recess can be coordinated with one another such that predefined clamping forces or frictional forces can be obtained during the assembly of the shell parts without problems. If the connection of the bearing shell parts is to be designed as a positive-locking connection rather than as a frictionally engaged connection, this can be achieved without problems by means of a suitable locking connection at the pins and in the recesses.

Corresponding to another advantageous embodiment of the subject of the present invention, the cylindrically designed support surface on the outside of the bearing shell is provided with a plurality of recesses arranged in the circumferential direction. These recesses lead to a rather substantial reduction in the weight of the bearing shell.

In addition, it may be advantageous to provide the inner hollow spherical bearing surface with at least two grooves extending in the direction of the central longitudinal axis for receiving lubricant. The grooves provided as a lubricant reservoir additionally contribute to the increase in the load possibilities and service lives of the ball-and-socket joints or ball sleeve joints, in addition to the corresponding material selection.

Moreover, it proved to be advantageous to select the thickness of the bearing shell to be constant in the area of the hollow spherical bearing surface, which additionally contributes to a uniform state of load of the bearing shell.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
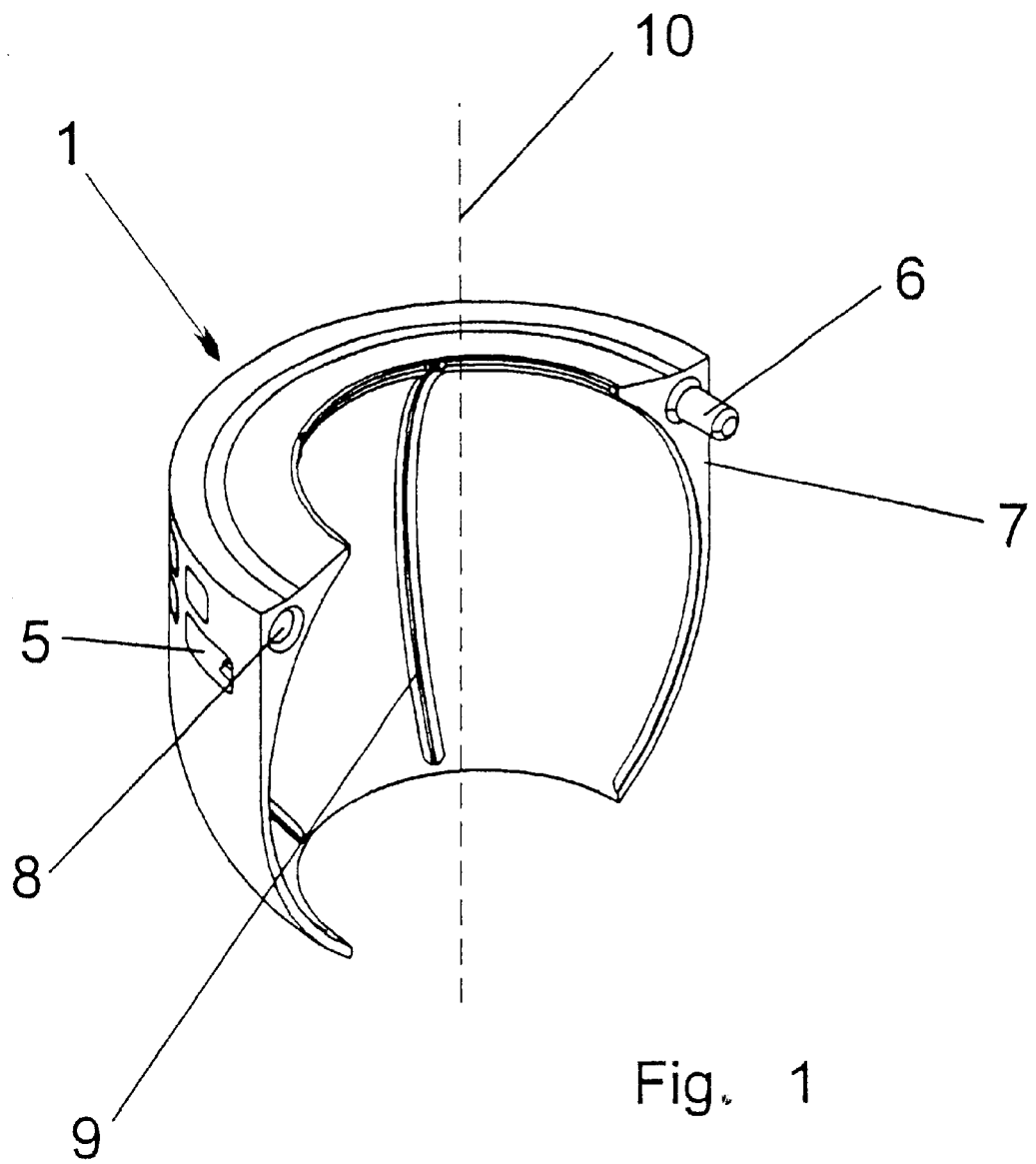
FIG. 1 is a three-dimensional view of the bearing shell according to the present invention.

Referring to the drawings in particular, the bearing shell according to the present invention comprises essentially two half shells 1 and 2, of which one half shell 1 is shown in the exemplary embodiment shown in FIG. 1. In the assembled state, the two half shells 1 and 2 form an inner hollow spherical bearing surface 3. On the outside the two half shells 1 and 2 have a cylindrical support surface 4, which can be inserted into a housing of a ball-and-socket joint. The two half shells 1 and 2 are coupled with one another by a clamping connection in the assembled state. In the exemplary embodiment shown in FIG. 1, the clamping connection comprises a pin 6, which projects beyond the parting surface 7 between the two half shells 1 and 2, and a corresponding recess 8, which was prepared in the parting plane of the half shell 2. A pin 6 as well as a recess 8 are present on one half shall 1 and 2, respectively. The diameters of the pin 6 and of the recess 8 are coordinated with one another such that a sufficient clamping action is obtained by frictional engagement in the assembled state. A plurality of recesses 5, which contribute to a reduction in the weight of the bearing shell according to the present invention, are arranged on the support surface 4. In addition, it can be seen in FIG. 1 that the hemispherical bearing surface 3 has a plurality of grooves 9, which have a depth of 0.1 mm to 0.3 mm and are intended for receiving lubricants, especially bearing greases.

Figure 2:
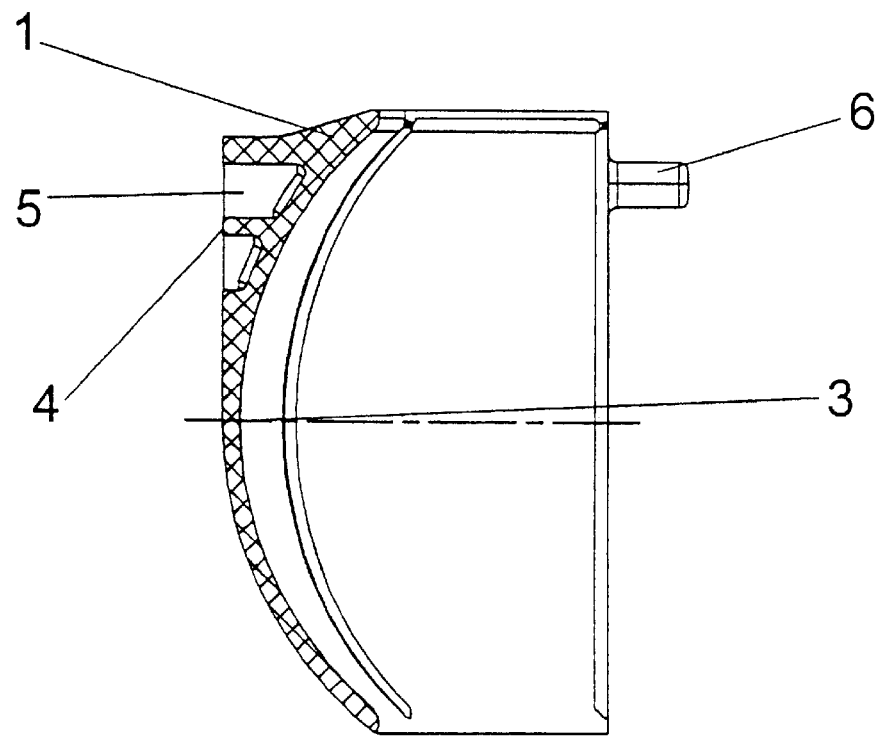
FIG. 2 is a sectional view through a half shell.

The sectional view in FIG. 2 shows especially clearly that the thickness of the bearing shell according to the present invention has a constant value in the area of the hollow spherical bearing surface 3, so that a uniform load of the bearing shell is guaranteed.

Figure 2A:
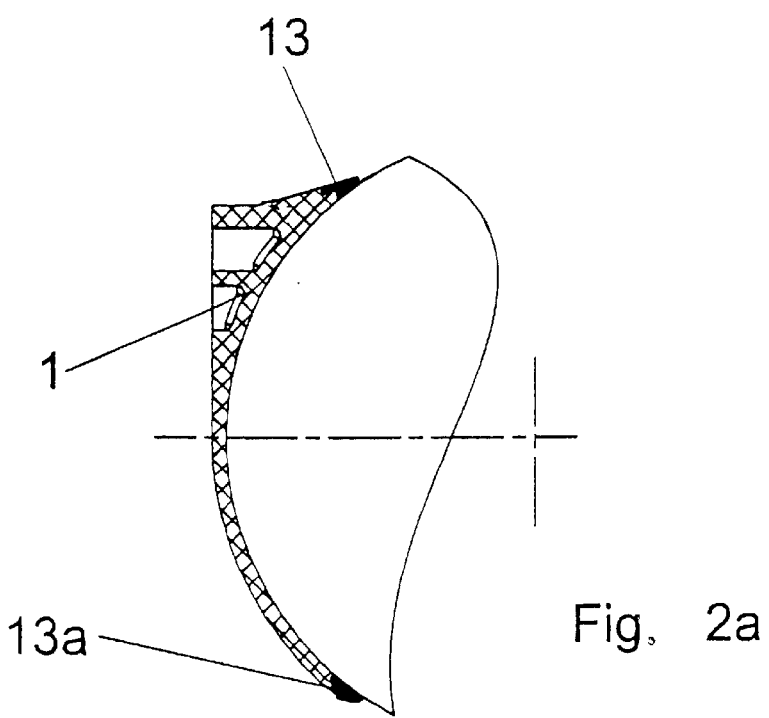
FIG. 2a is a sectional view through another embodiment of a half shall.

The exemplary embodiment according to FIG. 2a additionally uses elastomer seals 13 and 13a, which are in contact with the ball accommodated in the bearing shell 1. It should be observed that only the seal 13a is necessary in ball-and-socket joints because their housing is closed on one side.

Figure 3:
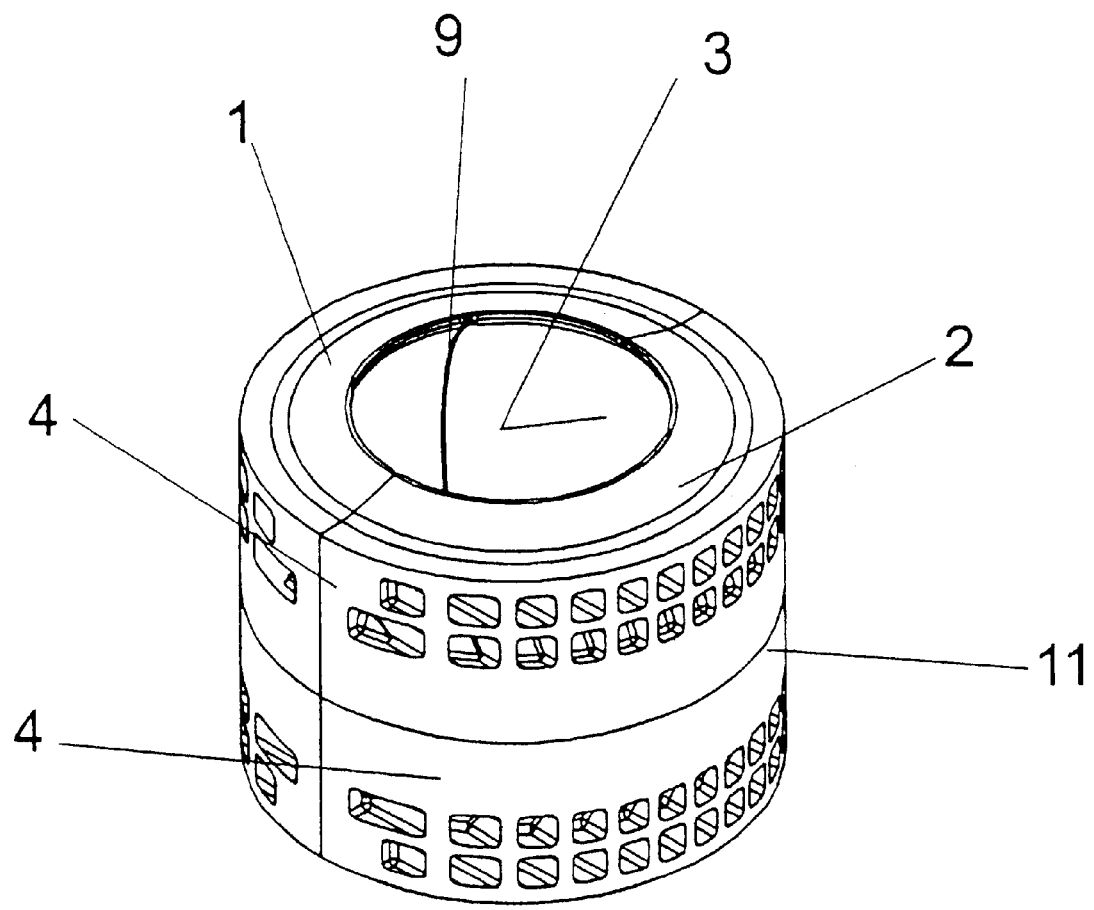
FIG. 3 is a three-dimensional view of a second embodiment of a bearing shell for a ball sleeve joint.

FIG. 3 shows another embodiment variant, which is intended for ball sleeve joints, contrary to the variant according to FIG. 1, which is intended for ball-and-socket joints. This embodiment variant differs by the fact that the half shells 1 and 2 are symmetrical to the equatorial plane 11, and the cylindrical support surface 4 comprises the entire outer area of the half shells 1 and 2 in this embodiment. Due to the symmetrical shape, locking of the half shells 1 and 2 is achieved in both the upper area and the lower area of the half shells. In analogy to the exemplary embodiment according to FIG. 1, the bearing surface 3 of the exemplary embodiment according to FIG. 3 also has grooves 9 for receiving lubricant. These grooves 9 extend, like those in FIG. 1, in parallel to the central longitudinal axis 10.

It is, of course, also conceivable to design the bearing shell according to the present invention not only as a two-part bearing shell but also as a multipart bearing shell, while the features and advantages essential for the present invention are obtained. The two-part and multipart design facilitates especially the assembly of a corresponding ball-and-socket joint or ball sleeve joint as well as the manufacture and the release from the mold of the corresponding shell parts. Due to the special design embodiment, it is now also possible—compared with the state of the art—to use plastics which could not hitherto be intended for use in ball-and-socket joint or ball sleeve joints because of their hardness or their lack of elasticity.

While specific embodiments of the invention have been shown and described in detail to illustrate the application of the principles of the invention, it will be understood that the invention may be embodied otherwise without departing from such principles.

What is claimed is:

1. A bearing shell for ball-and-socket joints or ball sleeve joints, the bearing shell comprising:

an inner hollow spherically designed bearing surface; and an outer cylindrically designed support surface, with which the bearing shell can be inserted into a joint housing, the bearing surface and the support surface having a multipart design with at least two shell parts that can be detachably coupled with one another by a clamping device, wherein the parting plane between the half shells extends in a direction of a central longitudinal axis of the bearing shell, said clamping device including at least one pin projecting beyond a respective parting surface of the half shells and at least one corresponding recess arranged in the respective other half shell, said clamping device both rotationally and laterally fixing one of said shell parts with another of said shell parts.

2. A bearing shell in accordance with claim 1, wherein the clamping device comprises a locking connection.

3. A bearing shell in accordance with claim 1, wherein the cylindrically designed support surface has a plurality of recesses arranged in the circumferential direction.

4. A bearing shell in accordance with claim 1, wherein the inner bearing surface has at least two grooves, extending in the direction of a central longitudinal axis, for receiving lubricants.

5. A bearing shell in accordance with claim 1, wherein the thickness of the bearing shell has a constant value in the area of the hollow spherical bearing surface.

6. A bearing shell for ball-and-socket joints or ball sleeve joints, the bearing shell comprising:

a first part with an inner bearing surface and an outer support surface, for support of the bearing shell relative to a joint housing;

a second part with an inner bearing surface and an outer support surface, for support of the bearing shell relative to a joint housing;

a connection device for fixing the first part with the second part wherein a parting plane between the first part and the second part extends in a direction of a central longitudinal axis of the bearing shell, the first part and the second part in a connected position forming a substantially spherical inner bearing surface, said connection device both rotationally and laterally fixing said first part with said second part.

7. A bearing shell in accordance with claim 6, wherein the connection device comprises a pin projecting beyond a parting surface of said first part and a corresponding recess arranged in the second part.

8. A bearing shell in accordance with claim 6, wherein the connection device comprises a locking connection.

9. A bearing shell in accordance with claim 6, wherein the support surface of the first part and the second part combine to form a substantially cylindrical support surface with a plurality of recesses.

10. A bearing shell in accordance with claim 6, wherein the first part inner bearing surface has a groove extending in the direction of a central longitudinal axis of the bearing shell.

11. A bearing shell in accordance with claim 6, wherein the bearing surface of the first part and the bearing surface of the second part combine to form a substantially spherical bearing surface with a substantially constant thickness.

12. A bearing shell in accordance with claim 6, wherein: said connection device positively locks said first part with said second part.

13. A bearing shell in accordance with claim 6, wherein: said connection device provides a clamping force holding said first part and said second part together.

14. A bearing shell in accordance with claim 7, wherein:

an interface between said pin and said recess provides frictional forces holding said first part and said second parts together.

15. A bearing shell in accordance with claim 1, wherein:

said clamping device positively locks one of said shell parts with another of said shell parts.

16. A bearing shell in accordance with claim 1, wherein:

said clamping device provides a clamping force holding one of said shell parts and another of said shell parts together.

17. A bearing shell in accordance with claim 1, wherein:

an interface between said pin and said recess provides frictional forces holding one of said shell parts and another of said shell parts together.

18. A bearing shell in accordance with claim 6, wherein:

said connection device of each of said first and second parts has a pin and recess engageable with a pin and recess of the other of said first and second parts, each said pin and recess being arranged on diametrically opposite sides of a respective said first and second part.

* * * * *